United States Patent
Burtner et al.

(10) Patent No.: US 9,245,438 B2
(45) Date of Patent: Jan. 26, 2016

(54) WATER LEAK DETECTOR FOR A PIPE HAVING A RETENTION RESERVOIR

(71) Applicant: Masco Corporation of Indiana, Indianapolis, IN (US)

(72) Inventors: Daniel C. Burtner, Noblesville, IN (US); Garry Robin Marty, Fishers, IN (US); Paul V. Patton, Indianapolis, IN (US); Joel D. Sawaski, Indianapolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 17 days.

(21) Appl. No.: 14/287,885

(22) Filed: May 27, 2014

(65) Prior Publication Data

US 2015/0348392 A1    Dec. 3, 2015

(51) Int. Cl.
*G08B 21/00* (2006.01)
*G08B 21/18* (2006.01)
*G01F 23/00* (2006.01)

(52) U.S. Cl.
CPC .............. *G08B 21/182* (2013.01); *G01F 23/00* (2013.01)

(58) Field of Classification Search
CPC ............................... G08B 21/182; G01F 23/00
USPC .......... 340/604, 605; 70/40, 40.5 R; 137/312; 200/61.04
See application file for complete search history.

(56) References Cited

U.S. PATENT DOCUMENTS

| | | | |
|---|---|---|---|
| 4,305,420 A | 12/1981 | Nussdorf | |
| 4,673,926 A | 6/1987 | Gorman | |
| 4,922,232 A | 5/1990 | Bosich | |
| 5,196,729 A | 3/1993 | Thorngren | |
| 5,992,218 A | 11/1999 | Tryba et al. | |
| 6,038,914 A | 3/2000 | Carr et al. | |
| 6,058,519 A | 5/2000 | Quintana | |
| 6,079,252 A | 6/2000 | Tabler et al. | |
| 6,175,310 B1 | 1/2001 | Gott | |
| 6,367,096 B1 | 4/2002 | Quintana | |
| 6,369,714 B2 | 4/2002 | Walter | |
| 6,523,562 B2 | 2/2003 | Harper | |
| 6,526,807 B1 | 3/2003 | Doumit et al. | |

(Continued)

FOREIGN PATENT DOCUMENTS

| | | |
|---|---|---|
| EP | 0062575 | 10/1982 |
| GB | 2365608 | 2/2002 |

(Continued)

OTHER PUBLICATIONS

Water Leak Alarm, http://222.alibaba.com/product-gs/577928867/Wired_water_leak$_{13}$ detection_system_with.html, Sep. 9, 2013.

(Continued)

*Primary Examiner* — Jeffery Hofsass
(74) *Attorney, Agent, or Firm* — Faegre Baker Daniels LLP

(57) ABSTRACT

A water leak detector including a housing defining a retention reservoir, and a coupler connected to the housing and configured to secure the housing to a water pipe. A switch is supported by the housing and is configured to detect water at a predetermined level within the reservoir. An indicator may be an electrical communication with the switch to provide an indication to a user when water has reached the predetermined level within the reservoir.

22 Claims, 7 Drawing Sheets

(56) References Cited

U.S. PATENT DOCUMENTS

| | | |
|---|---|---|
| 6,639,517 B1 | 10/2003 | Chapman et al. |
| 6,865,941 B2 | 3/2005 | Gibbs |
| 6,877,359 B2 | 4/2005 | Huang et al. |
| 6,978,659 B2 | 12/2005 | Phillips et al. |
| 7,383,721 B2 | 6/2008 | Parsons et al. |
| 7,956,760 B2 | 6/2011 | Hill |
| 8,281,645 B2 | 10/2012 | Dryden |

FOREIGN PATENT DOCUMENTS

| | | |
|---|---|---|
| GB | 2442988 | 4/2008 |
| WO | WO 2006/086178 | 8/2006 |
| WO | WO 2009/072682 | 6/2009 |

OTHER PUBLICATIONS

Rheem FloodStop Leak Detection System Whole-House Wireless Model, Rheem, http://www.homedepot.com/p/Rheem-FloodStop-Leak-Detection-System-Whole-House-Wireless-Model-RH99005/203240103#.Ui3vElOk5s, Sep. 9, 2013.

Installing a WaterCop Leak detection System, http://www.oldtownhome.com/2013/3/18/installing-a-WaterCop-Leak-Detection-System/, Sep. 9, 2013.

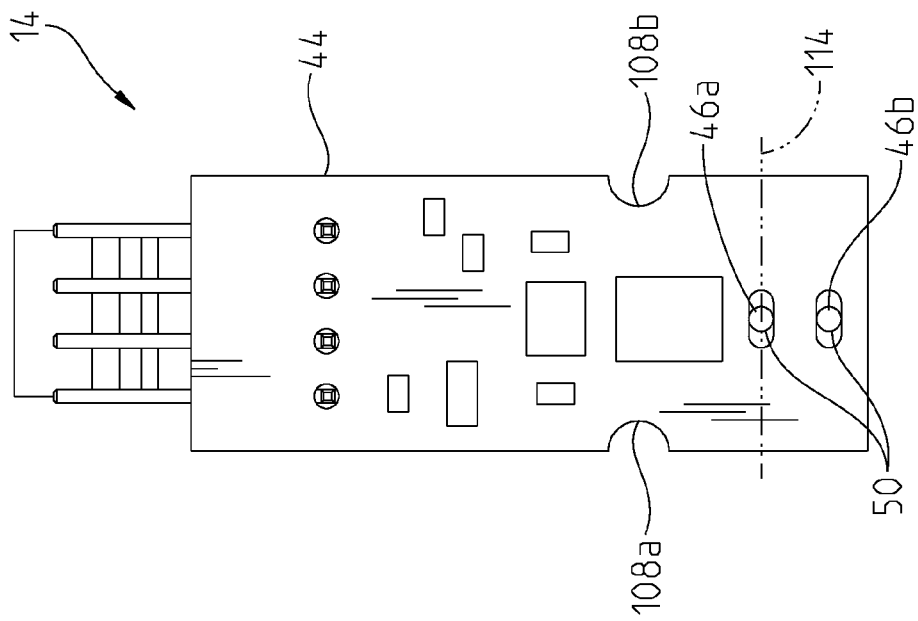
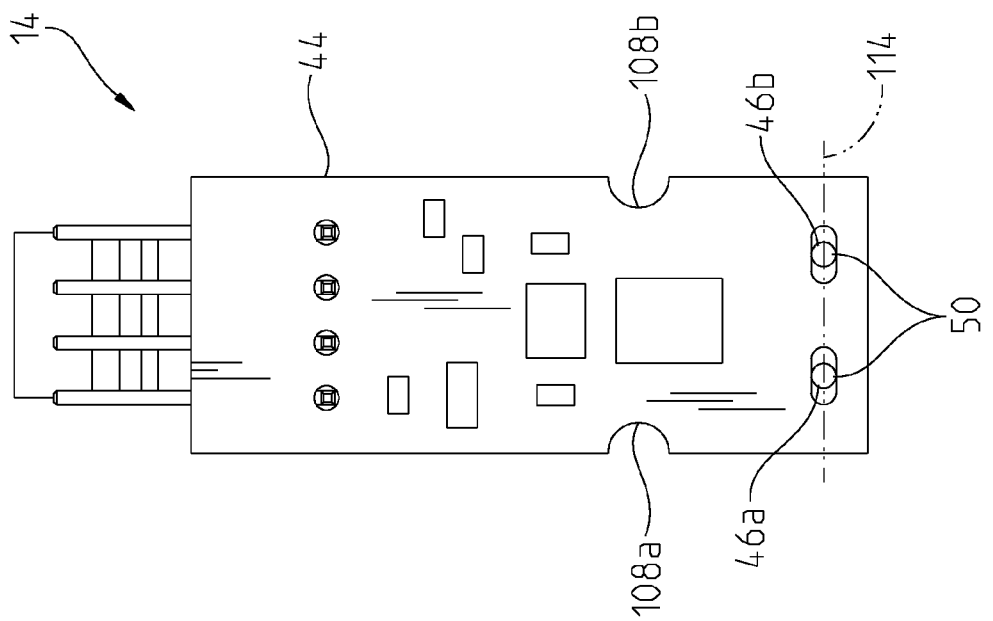

WATER LEAK DETECTOR FOR A PIPE HAVING A RETENTION RESERVOIR

BACKGROUND AND SUMMARY OF THE DISCLOSURE

The present invention relates generally to a water leak detector and, more particularly, to a water leak detector for providing an early alert of leaks in water lines coupled to plumbing fixtures, such as control valves in faucet or tub/shower installations.

Water leakage from plumbing fixtures and appliances (e.g., dishwashers, washing machines, icemakers, etc.) in residential and commercial buildings may cause significant damage to the building's structure, trim and/or cabinetry. For example, even slow or intermittent leaks from water supply lines may, over time, cause significant damage. Leaks from water supply lines to faucets, especially when small, may go undetected for extended periods of time due to their hidden locations under sinks, within walls or below sink decks.

According to an illustrative embodiment of the present disclosure, a water leak detector includes a housing having an annular inner wall, an annular outer wall concentrically position radially outwardly from the inner wall, and an annular retention reservoir defined between the inner wall and the outer wall. A coupler is connected to the housing and is configured to secure the inner wall of the housing to a water pipe. A switch is supported by the housing and is configured to detect water at a predetermined level within the retention reservoir. An indicator is an electrical communication with the switch to provide an indication to a user when water has reached the predetermined level within the retention reservoir.

According to another illustrative embodiment of the present disclosure, a water leak detector includes a housing having a first portion and a second portion defining an annular inner wall, an outer wall positioned outwardly from the inner wall, and a retention reservoir defined between the inner wall and the outer wall. A coupler is connected to the housing and is configured to secure the inner wall of the housing to a water pipe. The coupler includes a living hinge and a catch mechanism, the living hinge pivotally coupling first ends of the first portion and the second portion, and the catch mechanism releasably coupling second ends of the first portion and the second portion. A switch is supported by the housing and is configured to detect water at a predetermined level within the retention reservoir.

According to a further illustrative embodiment, a water leak detector includes a housing having an inner wall, an outer wall positioned outwardly from the inner wall, and a retention reservoir defined between the inner wall and the outer wall. An absorbent material is received within the retention reservoir. A coupler is connected to the housing and is configured to secure the inner wall of the housing to a water pipe. A switch is supported by the housing and is configured to detect water at a predetermined level within the reservoir. An indicator is in electrical communication with the switch to provide an indication to a user of when water has reached the predetermined level within the retention reservoir.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 8 is a perspective view of the illustrative circuit board of FIG. 2; and

FIG. 9 is a perspective view of an alternative circuit board of FIG. 2.

DETAILED DESCRIPTION OF THE DRAWINGS

The embodiments of the invention described herein are not intended to be exhaustive or to limit the invention to precise forms disclosed. Rather, the embodiments elected for description have been chosen to enable one skilled in the art to practice the invention.

Figure 1:
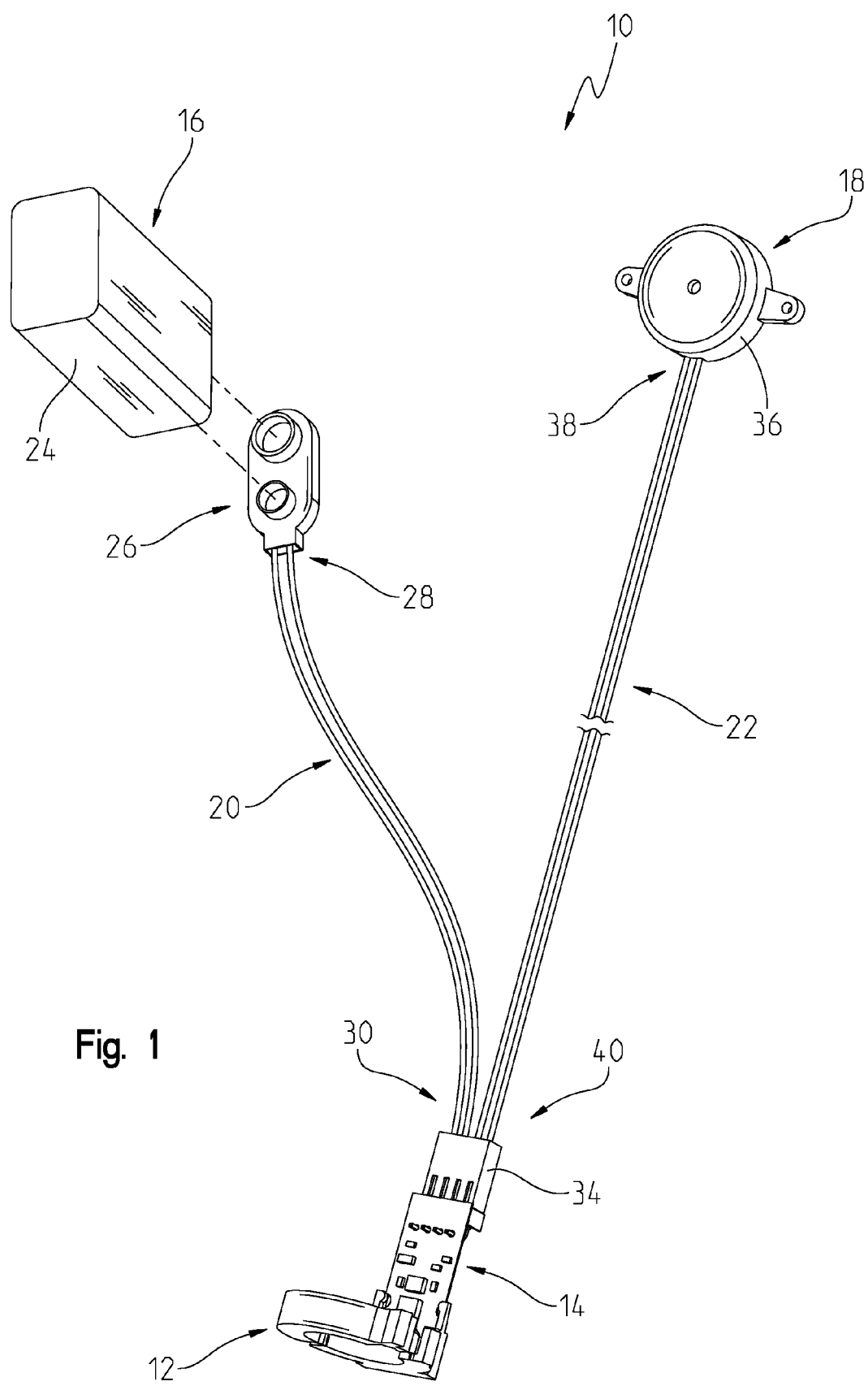
FIG. 1 is a perspective view of an illustrative water leak detector of the present disclosure.

With reference initially to FIG. 1, an illustrative water leak detector 10 includes a housing 12 supporting a controller 14. A power source 16 and an indicator 18 are illustratively coupled to the controller 14 through electrical cables 20 and 22, respectively.

The power source 16 may comprise a conventional battery 24. In the illustrative embodiment of FIG. 1, the power source 16 comprises a 9 volt battery 24 coupled to the controller 14 through a connector 26 secured to first ends 28 of electrical cables 20. Second ends 30 of the electrical cables 20 are illustratively received within recesses or sockets 32a of a connector 34 (FIGS. 2 and 3).

The indicator 18 may comprise an audible alarm, such as a buzzer 36, or a visible alarm, such as a light (not shown). In the illustrative embodiment of FIG. 1, the indicator 18 includes buzzer 36 coupled to the controller 14 through first ends 38 of the electrical cables 22. Second ends 40 of the electrical cables 22 are illustratively received within recesses or sockets 32b of connector 34. In other illustrative embodiments, the controller 14 may communicate with remote indicators or display devices, including monitors, lights, and/or audible alarms, through a wired or wireless connection. In certain illustrative embodiments, a radio frequency (RF) transmitter (not shown) may be operably coupled to the controller 14 to transmit signals to remote indicators or display devices.

Figure 2:
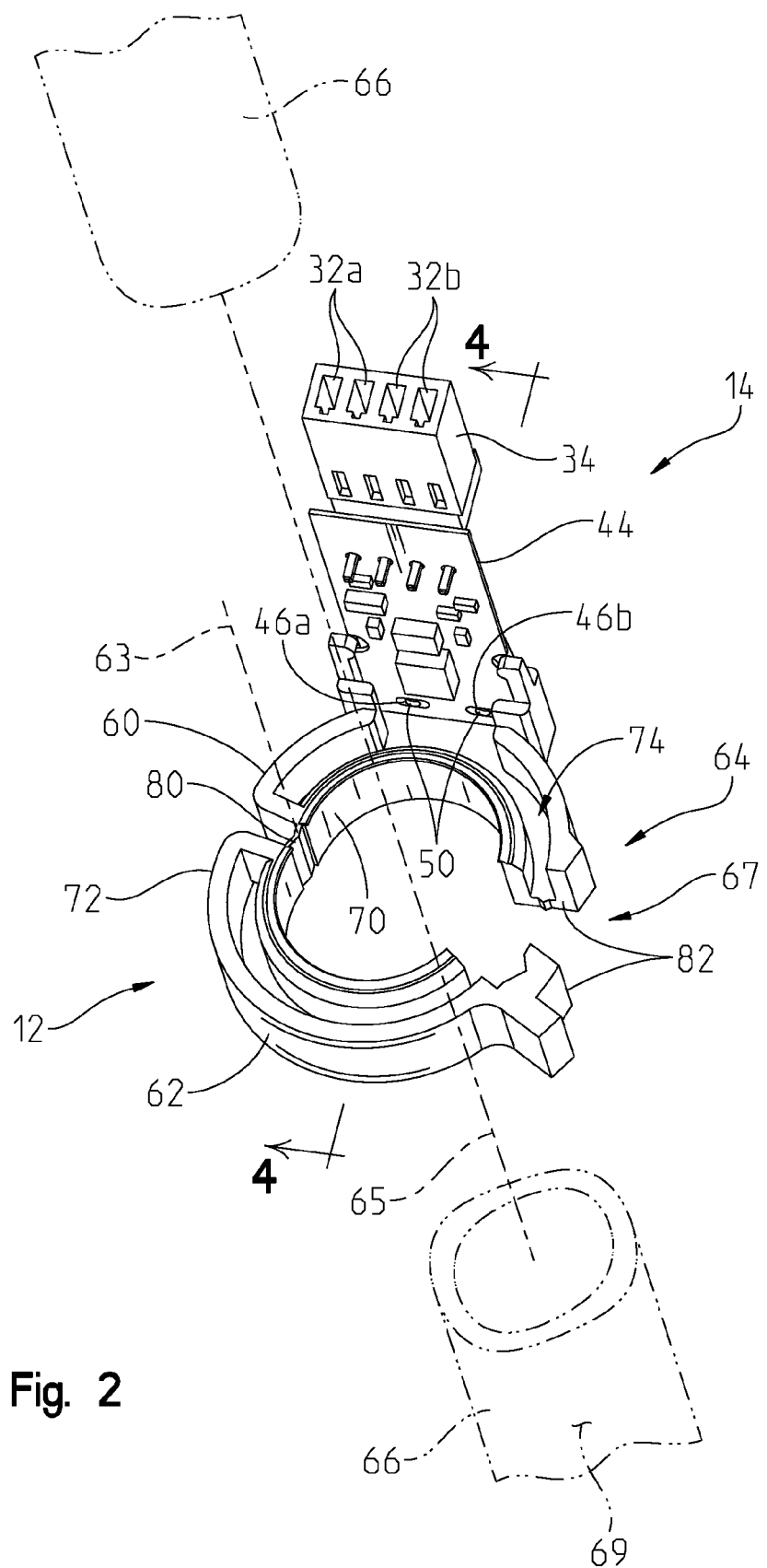
FIG. 2 is a perspective view of a housing and a circuit board of the leak detector of FIG. 1, with a cut-away tube shown in phantom.
Figure 3:
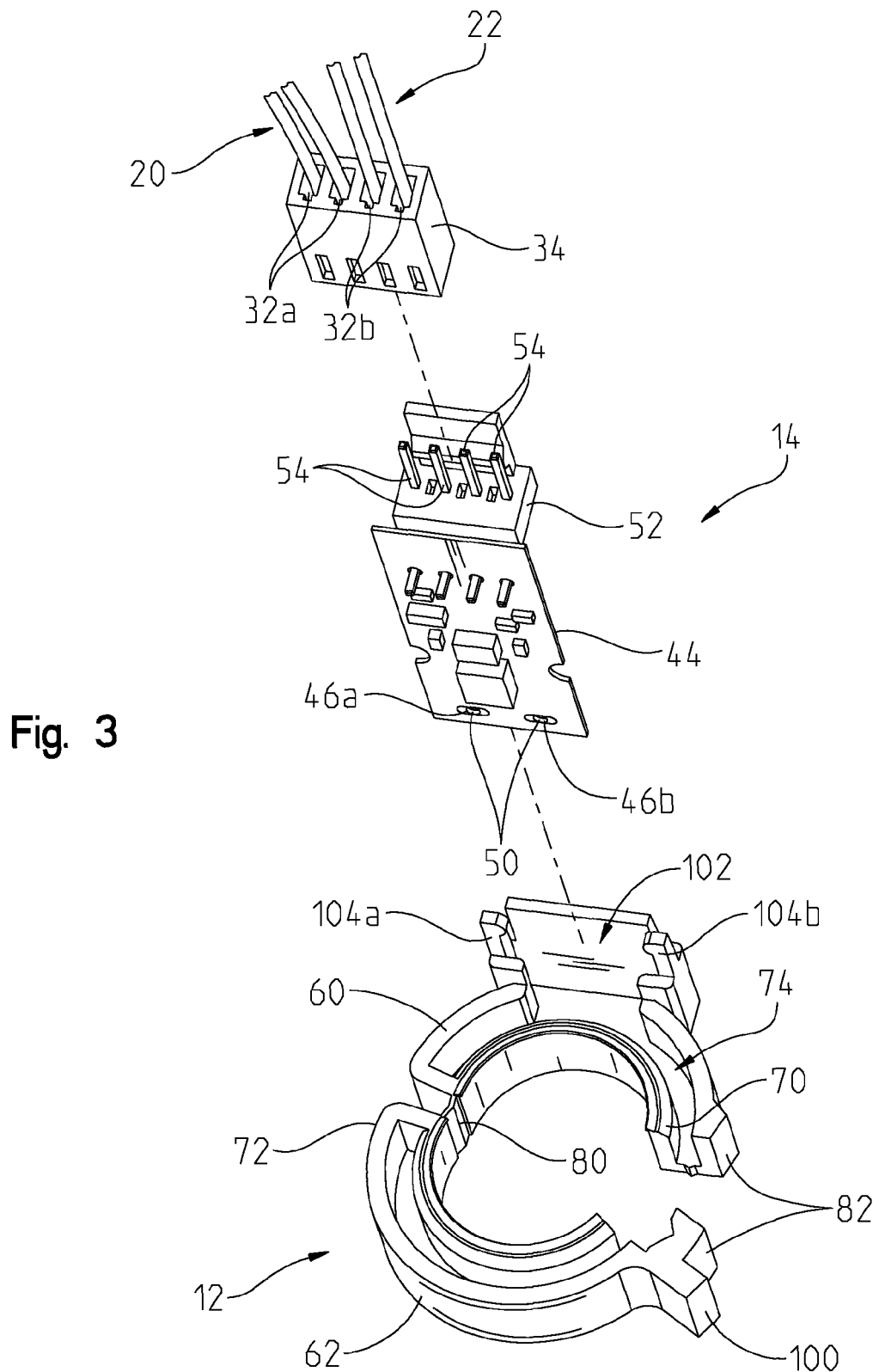
FIG. 3 is an exploded perspective view of the housing and the circuit board of FIG. 2.
Figure 4:
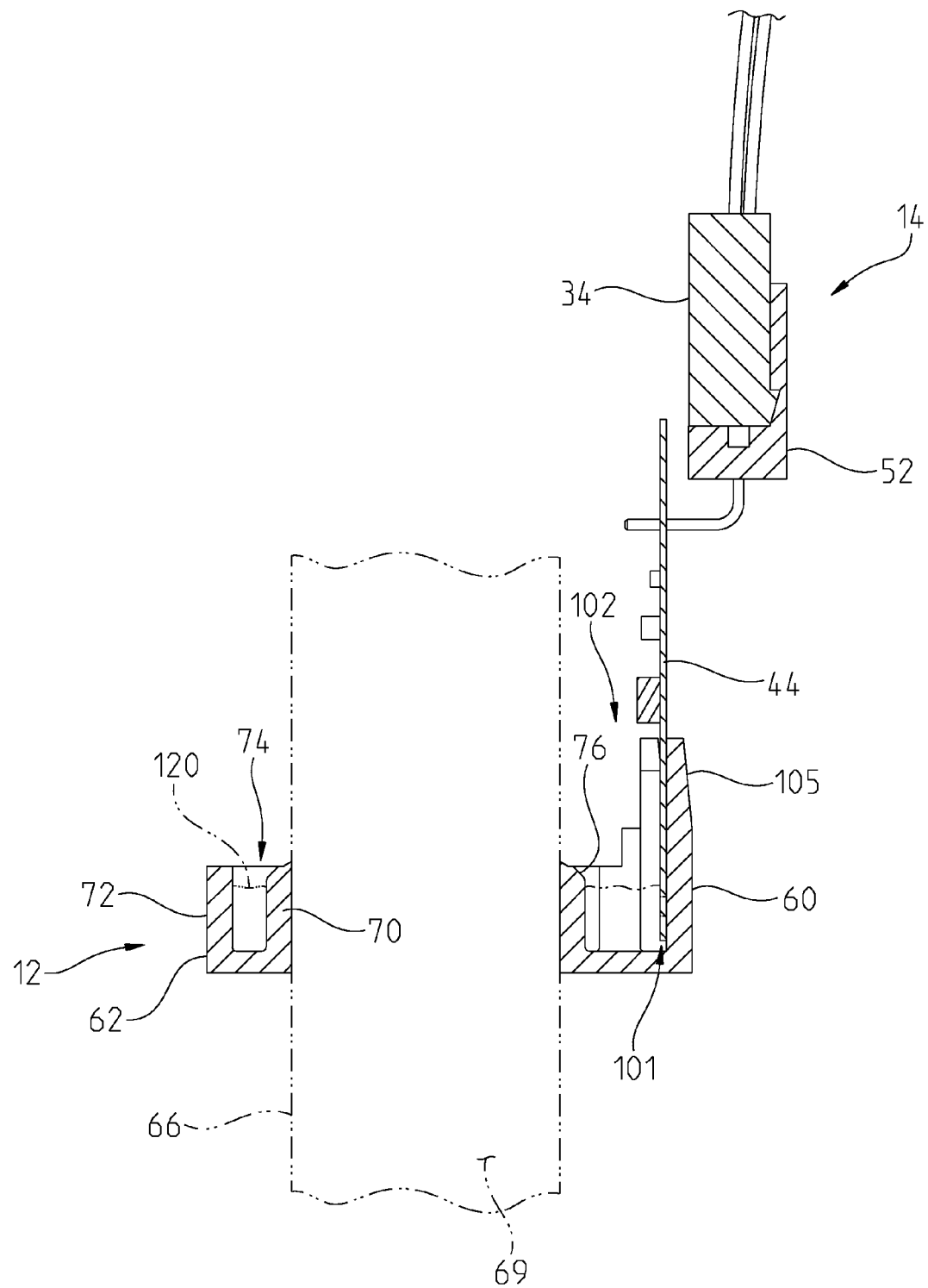
FIG. 4 is a cross-sectional view taken along line 4-4 of FIG. 2, with the housing in a closed configuration around a tube shown in phantom.

With reference to FIGS. 2-4, the controller 14 illustratively includes a printed circuit board (PCB) 44 including first and second electrical contacts, such as metal points or pins 46a and 46b, that define an embedded electrical switch 50. The circuit board 44 includes a shelf 52 supporting pins 54 electrically coupled to the connector 34 which, in turn, is electrically coupled to the cables 20 and 22.

Figure 5:
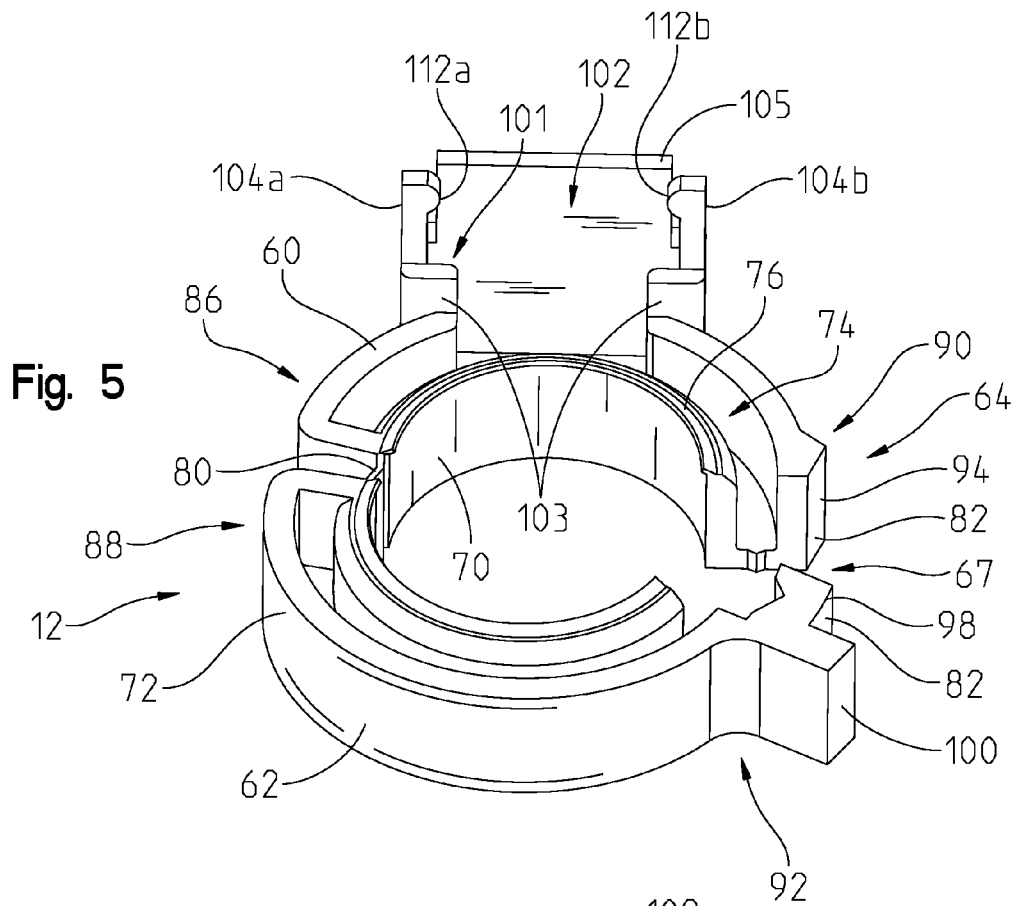
FIG. 5 is an upper perspective view of the housing of FIG. 2 in an open configuration.
Figure 6:
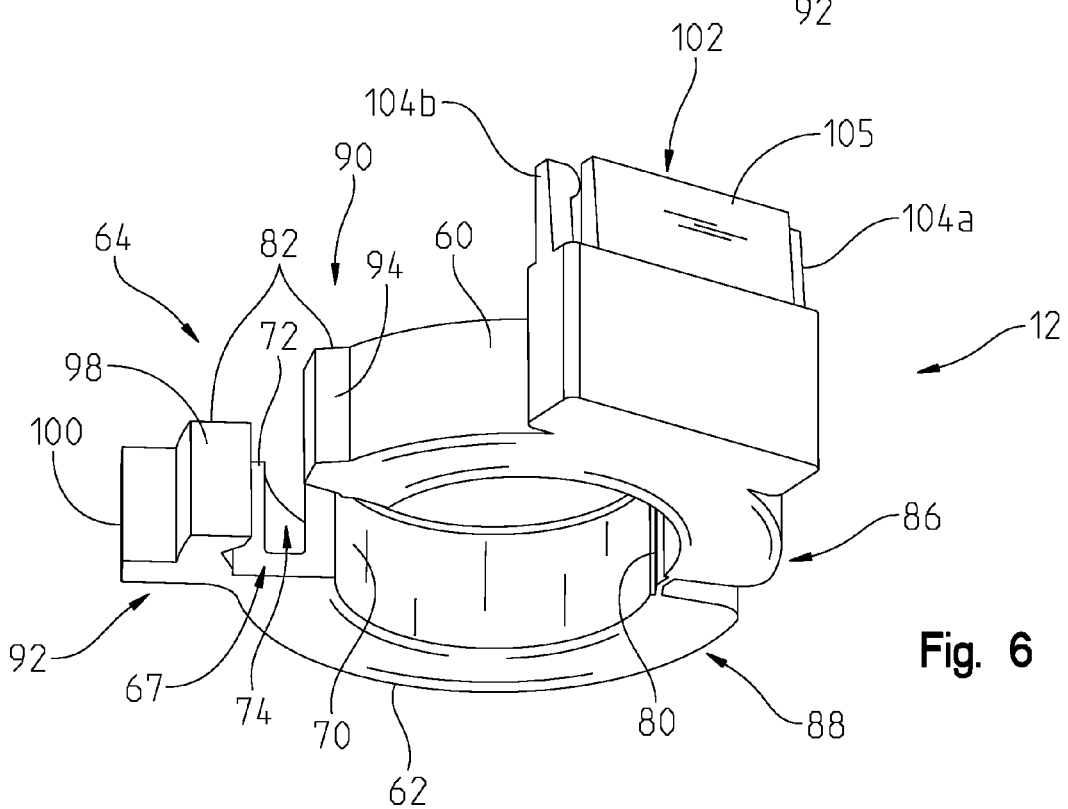
FIG. 6 is a lower perspective view of the housing of FIG. 2 in an open configuration.

Referring now to FIGS. 5 and 6, the housing 12 includes an arcuate first portion 60 operably coupled to an arcuate second portion 62. A coupler 64 connects the first portion 60 and the second portion 62, and is configured to secure the housing 12 to a water pipe or tube 66. The water tube 66 may be of conventional design, such as a water supply tube formed of a copper or polymer, such as cross-lined polyethylene (PEX). In certain illustrative embodiments, the water tube 66 may be configured to supply water under pressure to an appliance or plumbing fixture. For example, the water tube 66 may comprise a hot or cold water supply tube for a faucet (not shown).

Illustratively, the housing 12 may be formed integrally as a single unitary component with the coupler 64. More particularly, the first and second portions 60 and 62 of the housing 12 and the coupler 64 may be integrally molded from a polymer, such as a thermoplastic.

Figure 7:
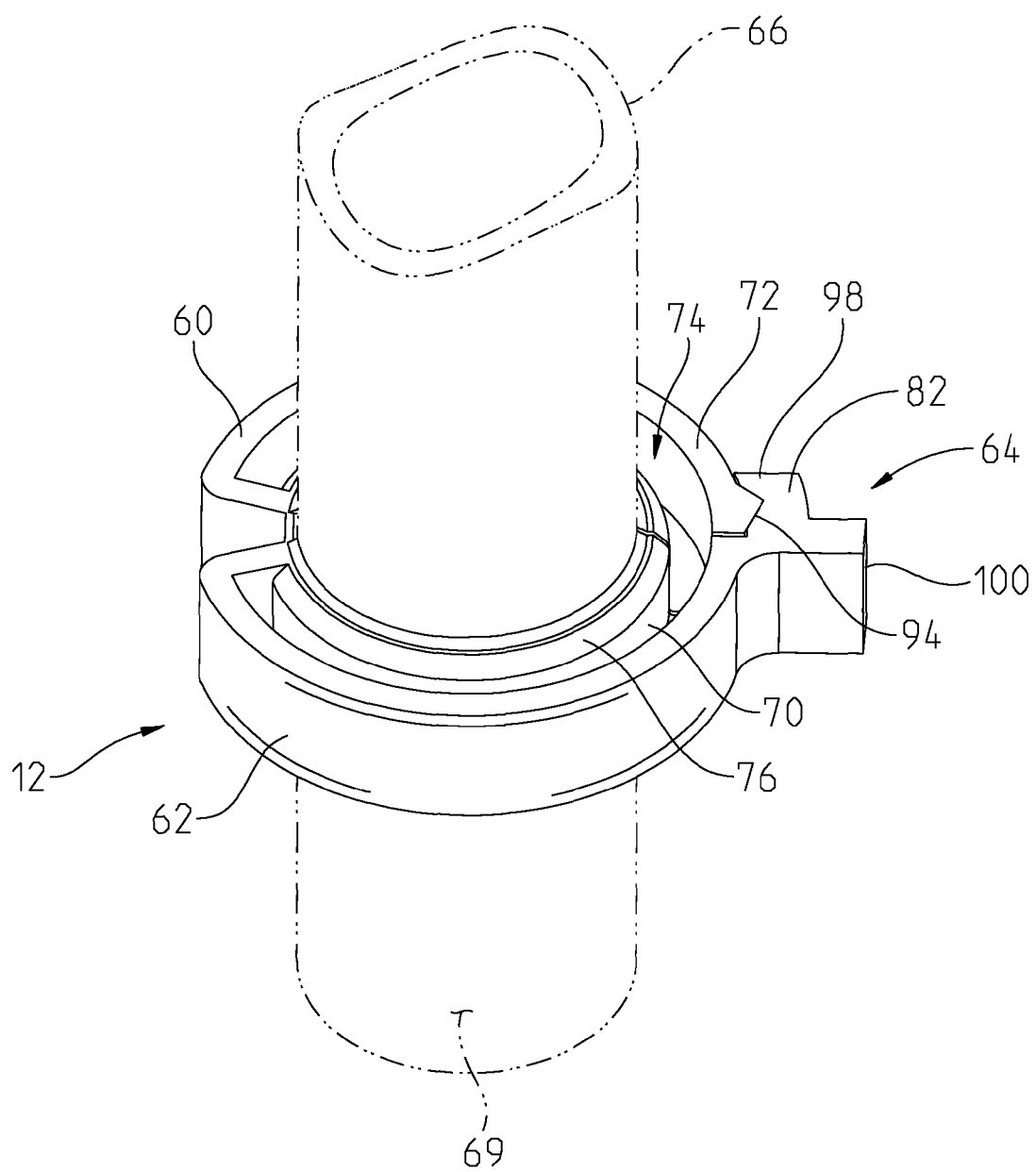
FIG. 7 is an upper perspective view of the housing of FIG. 2 in a closed configuration around a tube shown in phantom.

The coupler 64 allows the housing 12 to move between an open configuration or position (FIG. 2), and a closed configuration or position (FIG. 7). More particularly, the second portion 62 pivots relative to the first portion 60 about an axis 63 extending parallel to the longitudinal axis 65 of the tube 66. In the open configuration of FIG. 2, a gap 67 is defined between the first and second portions 60 and 62 of the housing 12 to facilitate placement around the water tube 66. In the closed configuration of FIG. 7, the first and second portions 60 and 62 illustratively define a closed annular body 68 to conform to the outer surface 69 of the water tube 66. Frictional engagement between the annular body 68 and the outer surface 69 of the water tube 66 secures the housing 12 to the tube 66.

The body 68 of the housing 12 illustratively includes an inner wall 70 and an outer wall 72 positioned radially outwardly in spaced relation to the inner wall 70. The inner wall 70 is illustratively annular in its closed configuration to conform to the shape and size of the outer surface 69 of water tube 66. The outer wall 72 may also be annular in its closed configuration and concentrically positioned radially outwardly from the inner wall 70. It may be appreciated that the outer wall 72 may be of shapes and sizes.

A retention reservoir 74 is defined between the inner wall 70 and the outer wall 72. The retention reservoir 74 may be annular in view of the illustrative concentrically spaced apart annular inner and outer walls 70 and 72. The inner wall 70 illustratively includes a chamfered upper edge 76 configured to direct water radially outwardly from the outer surface of the tube 66 and into the reservoir 74.

With respect to FIGS. 5 and 6, the coupler 64 illustratively includes a hinge 80 and a latch 82. More particularly, the hinge 80 illustratively comprises a living hinge that pivotally couples first ends 86 and 88 of the first and second portions 60 and 62, respectively, of the housing 12. The latch 82 secures second ends 90 and 92 of the first and second portions 60 and 62, respectively, of the housing 12 in the closed configuration. The latch 82 illustratively includes a first member or protrusion 94 protruding radially outwardly from the outer wall 72 at the second end 90 of the first portion 60. The latch 82 further includes a second member, illustratively a hook or tab 98, coupled to the second end 92 of the second portion 62. The hook 98 is configured to snap or latch over the protrusion 94, thereby securing the second ends 90 and 92 of the first and second portions 60 and 62 together such that the housing 12 is secured in the closed configuration. A tab or handle 100 extends outwardly proximate the hook 98 to facilitate a user closing and opening of the latch 82.

As shown in FIGS. 5, 6, 8 and 9, the housing 12 further illustratively includes a receiver 102 for supporting the circuit board 44. A lower end of the circuit board 44 is received within a pocket 101 between inner and outer walls 103 and 105. A pair of cantilevered arms 104a and 104b are biasedly supported by the housing 12 within the receiver 102. The circuit board 44 includes a pair of opposing recesses or slots 108a and 108b that receive the cantilevered arms 104a and 104b. Tabs 112a and 112b are supported by arms 104a and 104b and are configured to keep the circuit board 44 attached to the housing 12. The contact pins 46a and 46b of switch 50 define a predetermined water level 114 at which water in the reservoir 74 defines an electrical bridge.

It may be appreciated the metal contact pins 46a and 46b may be stacked in a horizontal configuration (FIG. 8) or in a vertical configuration (FIG. 9) on the circuit board 44. In the vertical configuration of FIG. 9, more water must be collected in the reservoir 74 in order to trigger the indicator 18, than in the horizontal configuration of FIG. 8. In other words, the predetermined water level 114 for establishing the electrical bridge defined between the contact pins 46a and 46b is higher in FIG. 9 than in FIG. 8.

It may be appreciated that multiple leak detectors 10 may be pigtailed together (e.g., electrically wired in series) in order to cover multiple potential leak points. For example, multiple leak detectors 10 may supply information to a single remote main control unit (not shown) to provide leak information to a user in connection with multiple faucet installations.

The connecting ends 90 and 92 of the housing 12 are close enough such that surface tension of the water allows the retention reservoir 74 to fill up if water leaks from the tube 66 or associated plumbing connections to which the leak detector 10 is attached. Once sufficient water has accumulated in the reservoir 74 (i.e., reaches the predetermined water level 114), the water will act as a bridge between the first and second metal contact pins 46a and 46b in the embedded switch 50. This electrical bridge then completes the circuit within the controller 14, resulting in the controller 14 activating the indicator 18. For example, in one illustrative embodiment the buzzer 36 may alert the user of a leak.

In certain illustrative embodiments, an absorbent material 120 (FIG. 4) may be positioned within the retention reservoir 74 to absorb water that may leak over time. The absorbent material 120 helps wick any leaking water and direct it into the reservoir 74. The material 120 may comprise any conventional absorbent cloth that may be retained within the reservoir 74 via conventional means, such as through the use of adhesives, retaining clips, etc.

The leak detector 10 may be installed by placing the housing 12 in an open configuration around water tube 66, illustratively at a lower portion thereof such that water from a potential leak will travel down the outer surface 69 of the tube 66 and into the retention reservoir 74. After positioning on the water tube 66, the housing 12 is closed around the water tube 66 and secured in place through frictional engagement between the inner wall 70 of the housing 12 and the outer surface 69 of the tube 66. Should a leak develop, water will be collected in the retention reservoir 74. Once the water reaches the predetermined water level 114 defined by the pins 46a and 46b, the electrical bridge is created therebetween, causing the controller 14 to activate the indicator 18.

Although the invention has been described in detail with reference to certain preferred embodiments, variations and modifications exist within the spirit and scope of the invention as described and defined in the following claims.

The invention claimed is:
1. A leak detector comprising:
   a housing including an annular inner wall, an annular outer wall concentrically positioned radially outwardly from the inner wall, and an annular retention reservoir defined between the inner wall and the outer wall;
   a coupler connected to the housing and configured to secure the inner wall of the housing to a water pipe;

a switch supported by the housing and configured to detect water at a predetermined level within the retention reservoir; and an indicator in electrical communication with the switch to provide an indication to a user when water has reached the predetermined level within the retention reservoir.

2. The leak detector of claim 1, wherein the switch comprises a pair of electrical contacts positioned such that water at the predetermined level in the retention reservoir electrically bridges the electrical contacts.

3. The leak detector of claim 1, wherein the indicator comprises at least one of an audible alarm and a visible light.

4. The leak detector of claim 1, wherein the inner wall includes a chamfered upper edge configured to direct water radially outwardly into the retention reservoir.

5. The leak detector of claim 1, further comprising a circuit board supporting the switch, wherein the housing includes a slot receiving the circuit board.

6. The leak detector of claim 5, further comprising arms supported by the housing and including tabs, the tabs being configured to engage within slots in the circuit board for retaining the circuit board to the housing.

7. The leak detector of claim 1, wherein the housing includes an arcuate first portion and an arcuate second portion, the coupler comprising a living hinge and a catch mechanism, the living hinge pivotably coupling first ends of the first portion and the second portion, and the catch mechanism releasably coupling the second ends of the first portion and the second portion.

8. The leak detector of claim 1, further comprising an absorbent material received within the retention reservoir.

9. A leak detector comprising:
a housing including a first portion and a second portion defining an annular inner wall, an outer wall positioned outwardly from the inner wall, and a retention reservoir defined between the inner wall and the outer wall;
a coupler connected to the housing and configured to secure the inner wall of the housing to a water pipe, the coupler comprising a living hinge and a catch mechanism, the living hinge pivotably coupling first ends of the first portion and the second portion, and the catch mechanism releasably coupling second ends of the first portion and the second portion; and
a switch supported by the housing and configured to detect water at a predetermined level within the retention reservoir.

10. The leak detector of claim 9, further comprising an indicator in electrical communication with the switch to provide an indication to a user when water has reached the predetermined level.

11. The leak detector of claim 10, wherein the indicator comprises at least one of an audible alarm and a visible light.

12. The leak detector of claim 9, wherein the switch comprises a pair of electrical contacts positioned such that water at the predetermined level within the retention reservoir electrically bridges the electrical contacts.

13. The leak detector of claim 9, wherein the inner wall includes a chamfered upper edge configured to direct water radially outwardly into the reservoir.

14. The leak detector of claim 9, further comprising a circuit board supporting the switch, wherein the housing includes a slot receiving the circuit board.

15. The leak detector of claim 14, further comprising arms supported by the housing and including tabs, the tabs being configured to engage within slots in the circuit board for retaining the circuit board to the housing.

16. The leak detector of claim 9, further comprising an absorbent material received within the retention reservoir.

17. A leak detector comprising:
a housing including an inner wall, an outer wall positioned outwardly from the inner wall, and a retention reservoir defined between the inner wall and the outer wall;
an absorbent material received within the reservoir;
a coupler connected to the housing and configured to secure the inner wall of the housing to a water pipe;
a switch supported by the housing and configured to detect water at a predetermined level within the retention reservoir; and
an indicator in electrical communication with the switch to provide an indication to a user of when water has reached the predetermined level within the retention reservoir.

18. The leak detector of claim 17, wherein the switch comprises a pair of electrical contacts positioned such that water at a predetermined level electrically bridges the contacts in the reservoir.

19. The leak detector of claim 17, wherein the indicator comprises at least one of an audible alarm and a visible light.

20. The leak detector of claim 17, wherein the inner wall includes a chamfered upper edge configured to direct water radially outwardly into the retention reservoir.

21. The leak detector of claim 17, further comprising a circuit board supporting the switch, wherein the housing includes a slot receiving the circuit board.

22. The leak detector of claim 17, wherein the housing includes an arcuate first portion and an arcuate second portion, the coupler comprising a living hinge and a catch mechanism, the living hinge pivotably coupling first ends of the first portion and the second portion, and the catch mechanism releasably coupling the second ends of the first portion and the second portion.

* * * * *